United States Patent
Yoshida

(10) Patent No.: US 7,250,015 B2
(45) Date of Patent: *Jul. 31, 2007

(54) HYDRAULIC TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 390 days.

This patent is subject to a terminal disclaimer.

(21) Appl. No.: 10/914,452

(22) Filed: Aug. 9, 2004

(65) Prior Publication Data

US 2005/0090342 A1   Apr. 28, 2005

(30) Foreign Application Priority Data

Oct. 27, 2003   (JP)   ............... 2003-366041

(51) Int. Cl.
*F16H 7/08* (2006.01)
(52) U.S. Cl. ..................................... 474/110

(58) Field of Classification Search ............... 474/101, 474/109, 110, 113, 117, 119
See application file for complete search history.

(56) References Cited

U.S. PATENT DOCUMENTS 7,077,772 B2 *  7/2006  Hashimoto et al. ......... 474/109
2004/0092350 A1  5/2004  Hashimoto et al.

FOREIGN PATENT DOCUMENTS

| DE | 102 14 036 A1 | 10/2002 |
| EP | 0 985 849 A1 | 3/2000 |
| EP | 1 223 364 A | 7/2002 |
| JP | 2002-286104 | 10/2002 |

* cited by examiner

*Primary Examiner*—Vicky A. Johnson
(74) *Attorney, Agent, or Firm*—Howson & Howson LLP

(57) ABSTRACT

In a hydraulic tensioner, a check valve provided on the rear end of a circular, cylindrical inner tensioner body, fits into a recess formed in the bottom of a hole in an outer body which receives the inner body. The check valve is radially offset from the center line of the inner body, and its engagement with the recess secures the inner body against rotation relative to the outer body.

2 Claims, 5 Drawing Sheets

HYDRAULIC TENSIONER

FIELD OF THE INVENTION

This invention relates to tensioners for maintaining proper tension in endless, flexible power transmission media such as timing chains, a timing belts, or the like, used, for example, in an internal combustion engine in an automobile. More specifically, the invention relates to improvements in hydraulic tensioners of the kind that utilize engine lubricating oil supplied under pressure through an engine block.

BACKGROUND OF THE INVENTION

FIG. 5 shows an example of a known hydraulic tensioner used in the timing drive system of an automobile engine or the like. The tensioner comprises a synthetic resin body 510, which can be attached to the side of an engine block, a metal cylinder 520 fitted into a circular hole 511 formed in the body 510, a plunger 540 inserted into the metal cylinder 520 in such a manner that the tip of the plunger 540 protrudes from the body 510, and a compression spring 530, inside the metal cylinder 520, for urging the plunger in the protruding direction so that the plunger presses the shoe of a tensioner lever (not shown) against a timing chain. A check valve mechanism 550, permits the flow of oil under pressure into an oil chamber formed between the inside of the plunger 540 and the metal cylinder 520, but blocks reverse flow. A blocking mechanism 560, comprising ratchet teeth 541 formed on an outer surface of the plunger 540, and a spring-biased pawl 561 engaged with the ratchet teeth 541, blocks retracting displacement of the plunger 540, which would otherwise occur when excessive impact force is exerted on the plunger by the timing chain upon starting of an engine. The tensioner shown in FIG. 5 is described in Japanese laid-open patent publication No. 2002-86104 at Page 6, left column, line 30 to page 6, right column, line 41.

In the above-described conventional hydraulic tensioner, the metal cylinder 520 is concentric with the circular hole 511. Consequently, in the assembly process, twisting of the metal cylinder is apt to occur as the cylinder is positioned in the hole 511. The ability of the metal cylinder to twist prevents rapid and accurate assembly of the tensioner. Moreover, twisting of the metal cylinder can prevent proper engagement of the ratchet pawl 561 with the ratchet teeth 541 on the plunger, preventing reliable application of tension to the transmission medium, causing vibration and noise due to reverse movement of the plunger, and potentially causing damage to the entire timing drive system.

Rotation of the metal cylinder 520 can also occur as a result of torsion applied by the compression spring 530 during operation of the tensioner, with the same adverse effects, namely, failure of the pawl to engage the ratchet teeth properly, unreliable application of tension, generation of noise, and damage.

The tendency of the metal cylinder to twist in the tensioner body can be avoided by measures such as welding, or the use of an adhesive, to fix the metal cylinder in the tensioner body. However, these measures are time-consuming and make assembly of the tensioner difficult.

Objects of the invention, therefore, are to solve the above-described problems encountered in conventional hydraulic tensioners; to provide a hydraulic tensioner that suppresses the vibration noise and breakage which are apt to occur during operation; and to achieve a hydraulic tensioner that can operate reliably over a long period of time. It is also an object of the invention to provide a versatile tensioner construction, in which selective assembly of any of various inner tensioner bodies with an outer body can be carried out efficiently, in order to accommodate various different forms of tensioner mounts.

SUMMARY OF THE INVENTION

The hydraulic tensioner in accordance with the invention comprises an outer body and an inner body. The outer body, which is preferably composed of a synthetic resin, is adapted to be mounted on an engine block, and has a circular, cylindrical hole formed therein for receiving the inner body. This cylindrical hole has an opening at one end thereof, and a bottom. An oil passage is provided in the outer body for conducting oil under pressure into the interior of the outer body from the exterior thereof, preferably through the engine block, from the engine oil supply. The inner body, which is received in the hole of the outer body, has an outer peripheral surface fitting the hole of the outer body. The outer peripheral surface is circular and cylindrical, and has a central axis. A plunger-accommodating hole is formed in the inner body, and a plunger, slidable in the plunger-accommodating hole, projects therefrom in a forward direction, for applying tension to an endless, flexible, power transmission medium, e.g., the engine timing chain. The inner body has a check valve fitted thereto for conducting oil under pressure into the plunger-accommodating hole and preventing reverse flow of oil out of the plunger-accommodating hole. A part of the check valve projects axially from the inner body in a rearward direction, opposite to the forward direction. The bottom of the hole of the outer body has a recess formed therein, and the oil passage communicates with the recess. The recess and the projecting part of the check valve are displaced radially from the central axis of the inner body, and the projecting part of the check valve fits into the recess.

The inner body can be inserted into any of several different types of outer bodies, depending, for example, on the manner in which the tensioner is mounted on an engine. Thus, conventional tensioner assembly lines can be used for production of various kinds of tensioners, thereby reducing equipment cost and saving factory space.

The offset location of the check valve and the recess in the bottom of the hole of the outer body ensures that the inner body is properly related to the outer body. Moreover, the check valve can be used as a mounting reference during assembly, so that rapid and accurate assembly can be carried out with reduced assembly effort.

Since the relative rotational positions of the outer body and the inner body are reliably established by use of the check valve unit as the mounting reference during assembly, noise and breakage of the timing chain due to rotational displacement of the inner body are suppressed.

The engagement of the check valve with the recess in the bottom of the hole in the outer body, locks the inner body against rotation due to torsion exerted by the compression spring. The locking of the inner body against rotation ensures uniform engagement between the ratchet teeth of the plunger and pawl, thereby reliably preventing retraction of the plunger, suppressing noise and breakage, and improving the durability of the tensioner.

The material of the outer body may be an aluminum alloy, a ferrous material or the like. However, because of the manner in which rotation of the inner body is prevented, the outer body can be formed from a synthetic resin, thereby reducing the overall weight of the tensioner. Formation of the outer body from a synthetic resin can be carried out by injection molding, which also eliminates various mechanical fabrication steps such as cutting and surface-smoothing, required in the case of a metal tensioner body.

Since the check valve is used as a mounting reference, the inner body of the tensioner can be fixed to the outer body by any of various means. For example, a locking ring such as a snap ring is preferred as a simple and effective device to secure the inner body to the outer body.

The hydraulic tensioner in accordance with the invention is applicable to various transmissions utilizing an endless, flexible transmission medium, including a timing chain such as a roller chain or a silent chain, or a timing belt such as a toothed belt.

DETAILED DESCRIPTION OF THE PREFERRED EMBODIMENT

Figure 1:
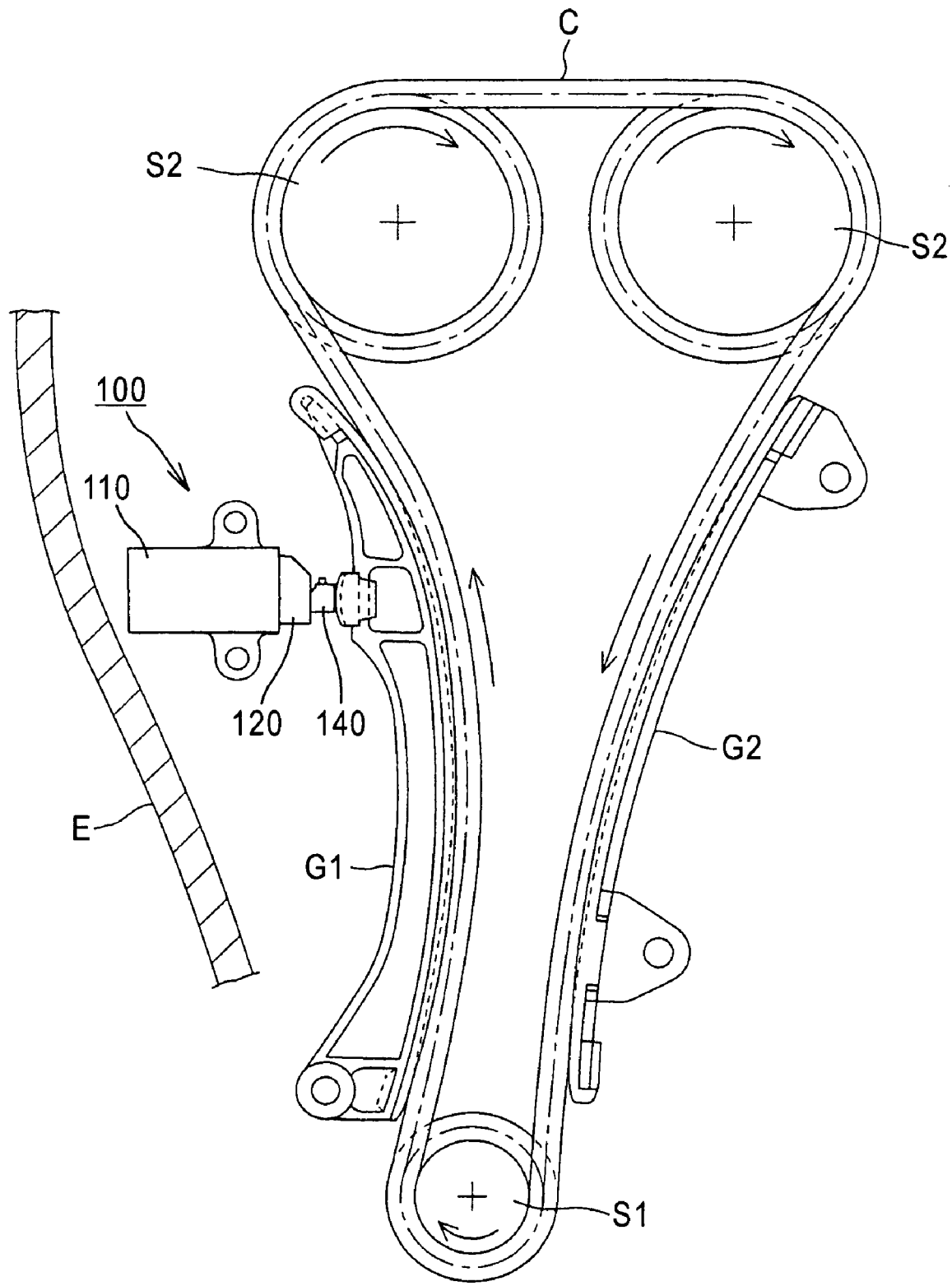
FIG. 1 is schematic view of the timing transmission of a dual cam internal combustion engine, illustrating a typical application of the hydraulic tensioner in accordance with the invention.

As shown in FIG. 1, a hydraulic tensioner 100 in accordance with the invention is mounted inside an engine block E for maintaining proper tension in an endless chain transmission comprising a chain C in mesh with a driving sprocket S1, on the crankshaft of an automobile engine, and two driven sprockets S2, each being on a camshaft. The tensioner 100 comprises an outer body 110, which is attached to the engine block E and an inner body 120, which exerts a force on a pivoted chain guide G1, which in turn, applies tension to the timing chain C. A fixed guide G2 is provided on the opposite side of the transmission for stabilizing the traveling path of the chain.

Figure 2:
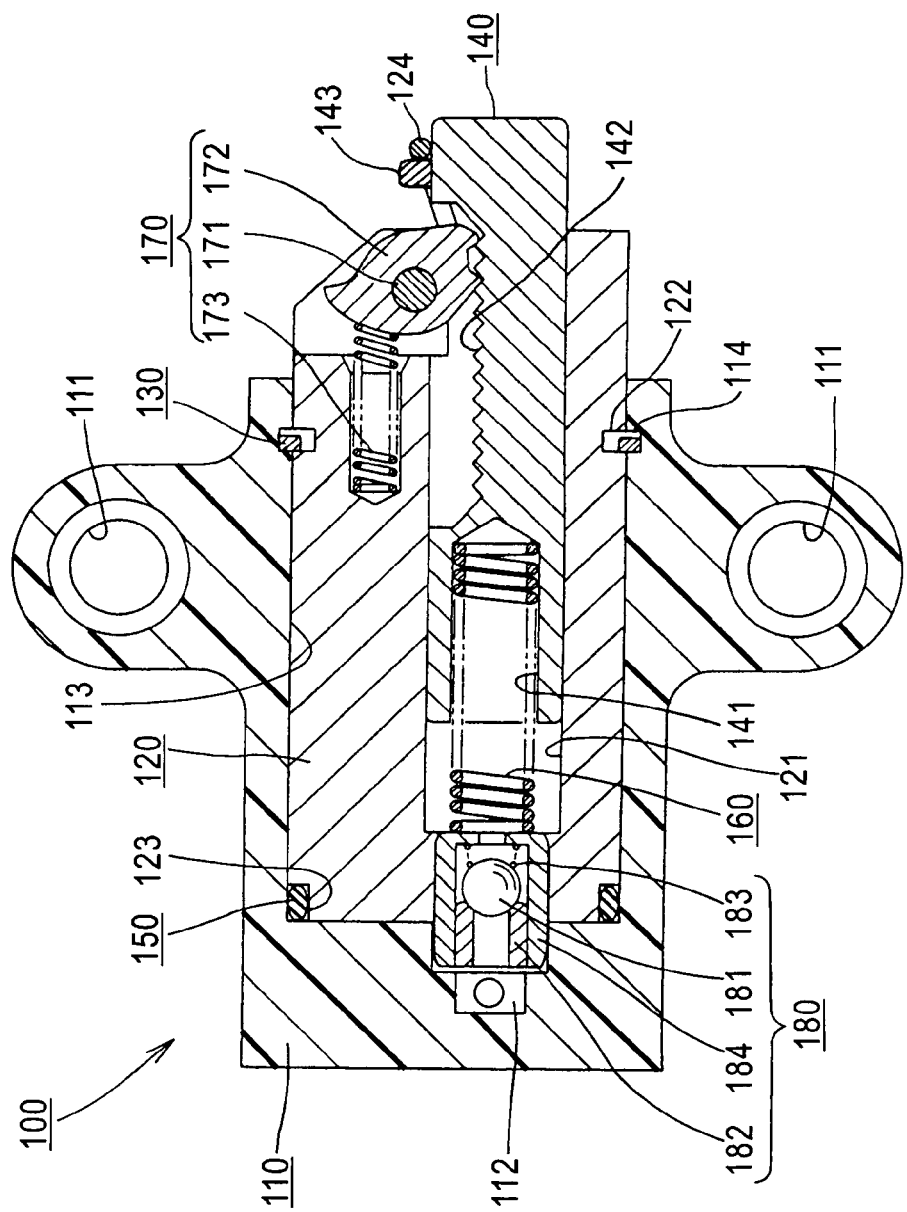
FIG. 2 is an axial cross section of the hydraulic tensioner shown in FIG. 1.

As shown in FIG. 2, the outer body 110 is preferably molded, by injection-molding, from a synthetic resin, and includes a tensioner mounting ears, each having a mounting hole 111 for mounting the tensioner on an engine block. In this example, the mounting holes 111 are disposed symmetrically for mounting the tensioner on the engine block. However, any of various kinds of tensioner mounting schemes can be utilized.

An oil supply passage 112 is provided in the outer body 110 for receiving oil under pressure from the engine block. The outer body is formed with a hole 113 for receiving an inner body 120. A circumferential locking groove 114 formed in the wall of hole 113, receives a snap ring 130 for fixing the inner body 120, to the outer body.

Whereas the outer body is preferably formed from a synthetic resin, the inner body 120, which is cylindrical in shape, is preferably formed by die-casting from an aluminum alloy or other metal. A plunger accommodating hole 121, in which a plunger 140 is slidable, is formed in the inner body 120. A circumferential locking groove 122 faces groove 114 when the inner body is fitted into the outer body, and both grooves engage the snap ring 130 to hold the inner body in place in the outer body. A circumferential step 123, formed on the rear end of the inner body, receives a sealing ring 150 for sealing a gap between the outer body 110 and the inner body 120.

A hollow portion 141, open toward the bottom of the plunger accommodating hole 121, is formed on one end of the plunger 140. This hollow portion 141 accommodates a compression spring 160, which biases the plunger 140 in the protruding direction toward a timing chain. The hollow portion 141 also cooperates with the plunger-accommodating hole to form a high pressure oil chamber within the tensioner.

Figures 3A, 3B:
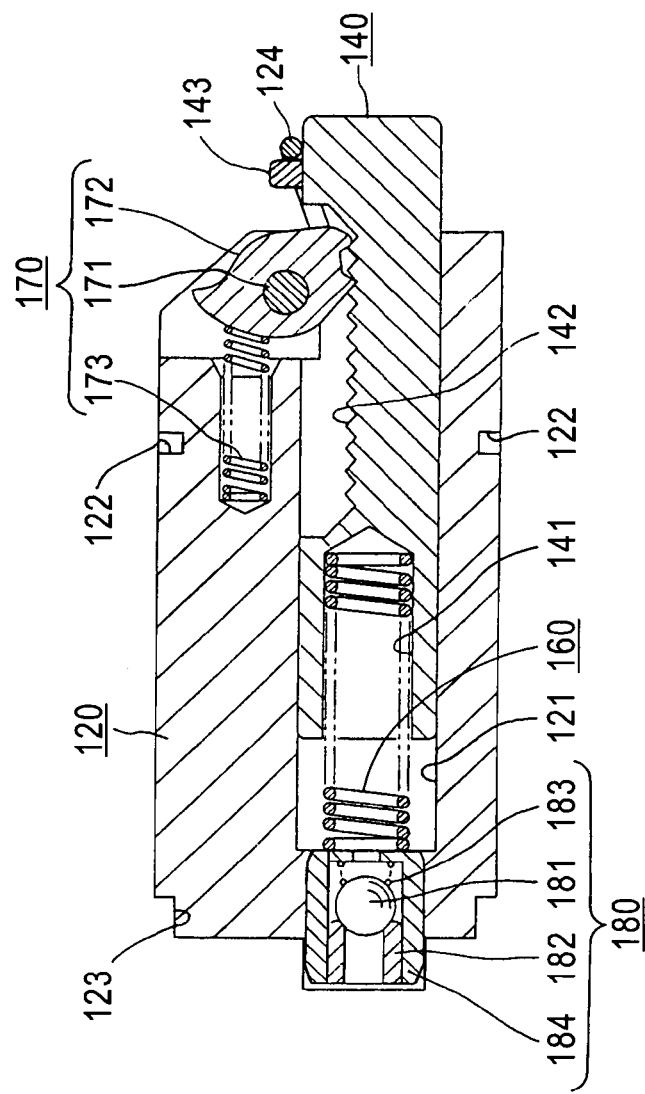
FIG. 3(A) is a left end elevational view of the inner body of the tensioner shown in FIG. 2.
FIG. 3(B) is an axial cross section of the inner body.

As shown in FIGS. 2 and 3(B), a retraction-preventing mechanism 170 is provided on the inner body 120. This mechanism prevents retracting movement of the plunger 140 when excessive impact force is applied to the tensioner from the timing chain on engine start-up. This retraction-preventing mechanism 170 comprises ratchet teeth 142 formed on a part of the outer circumference of the plunger 140, a ratchet pawl 172 pivotally supported by a shaft 171 in a cut-out groove formed at the tip of the inner body 120, and a spring 173, which biases the pawl 172 into engagement with the ratchet teeth 142. The pawl and ratchet teeth allow forward protrusion of the plunger 140, but limit the retracting movement of the plunger to a distance corresponding to the backlash of the ratchet mechanism.

As seen in FIGS. 2 and 3(B), a stop 124, composed of a wire spring attached to the tip of the inner body 120, is provided for engaging a pin 143, which protrudes radially from the tip of the plunger 140. The purpose of stop 124 is to prevent protrusion of the plunger 140 temporarily while the tensioner is being mounted on an engine block.

As shown in FIGS. 2 and 3(B), a check valve 180 comprises a ball 181, which controls the flow of oil into the oil chamber, a seat 182 on which the ball 181 seats, a spring 183, which biases the ball 181 into engagement with the seat, and a retainer 184. The retainer supports the spring 183, and the seat 182 is press-fit into the inner circumferential surface of the retainer. The retainer 184 is, in turn, press-fit into the bottom portion of the plunger accommodating hole 121. One end of the compression spring 160, which biases the plunger 140 in the protruding direction, is supported by an end surface of the retainer 184.

Figure 4:
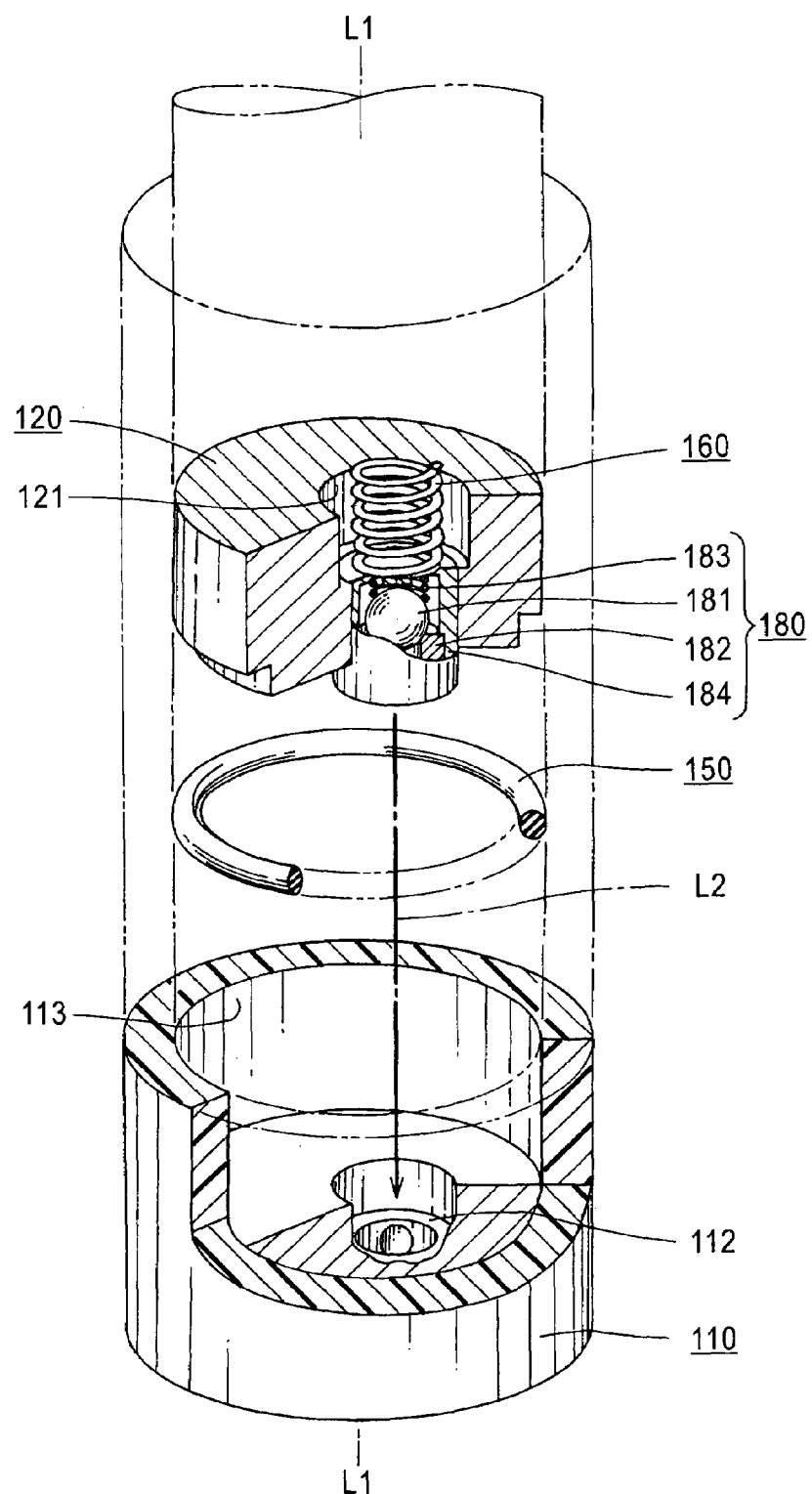
FIG. 4 is a broken=away exploded view illustrating the manner in which the check valve on the inner body is related to the recess in the bottom of the hole of the outer body during assembly of the tensioner.
Figure 5:
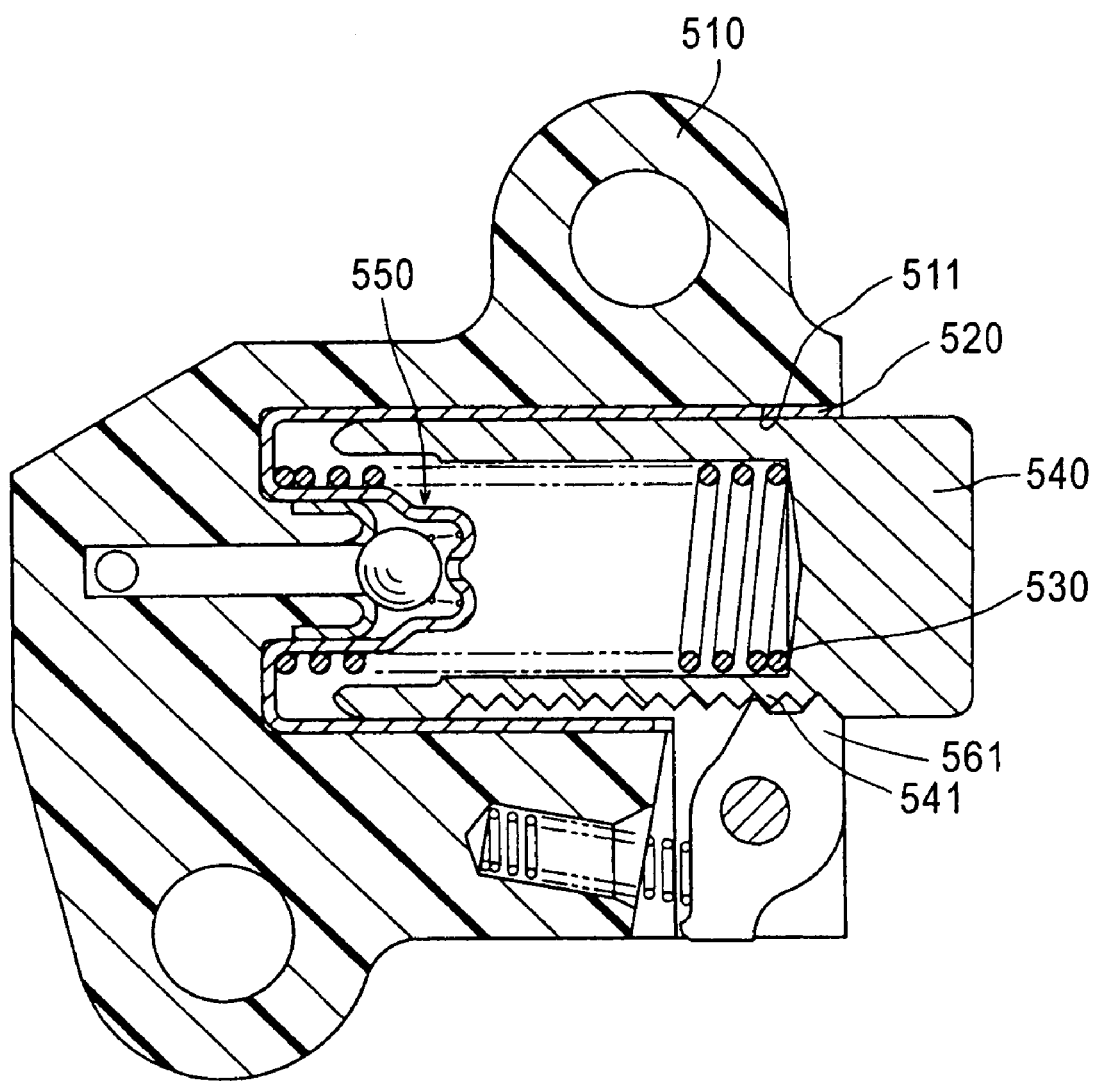
FIG. 5 is an axial cross-section of a conventional hydraulic tensioner.

As best shown in FIG. 4, the check valve 180 is incorporated into the tensioner at a position L2, which is spaced radially from a center line L1 of the inner body. A part of the check valve extends from the rear end of the inner body, and fits into a recess formed in the bottom of the hole of the outer body when the inner body 120 is fitted into the hole 113 formed in the outer body 110. When the check valve fits into the recess in the bottom of the hole of the outer body oil is supplied to the inner body 120 through the check valve from the oil supply passage 112 of the outer body 110. The radially offset relationship between the check valve 180 and the centerline of the inner body 120 is also illustrated in FIG. 3(A).

Since the outer body 110 and the inner body 120 are held together by a simple snap ring 130, and the check valve 180 prevents relative rotation between the inner and outer bodies, the tensioner can be assembled very easily, and a significant reduction in assembly labor can be realized. Furthermore, the oil passage 112 in the outer body 110 and the seat 182 in the check valve 180 are reliably aligned for fluid communication with each other. Accordingly, no resistance to the flow of oil is generated, and oil under can be supplied smoothly under pressure to the inner body 120 of the tensioner.

In the operation of the timing transmission, when the timing chain loosens, the plunger 140 is moved in the protruding direction by the compression spring 160. The check valve 180 opens to allow oil to flow under pressure into the oil chamber of the tensioner. When, as a result of increased tension in the chain, the tensioner receives an impact force from the chain, tending to push the plunger 140 back into the plunger-accommodating hole 121, the check valve closes, and oil in the pressure oil chamber passes through a small gap between the outer circumferential surface of the plunger 140 and the inner circumferential surface of the plunger-accommodating hole 121, so that it leaks to the outside of the tensioner. The flow resistance at that time exerts a cushioning effect, absorbing the impact energy. Further, since the retraction preventing mechanism 170 is provided, upon start-up of the engine, retracting movement of the plunger 140 is blocked by engagement between the ratchet teeth 142 and the pawl 172, and retraction is limited to a distance corresponding to the extent of the backlash of the ratchet mechanism.

When the timing chain becomes elongated as a result of use over a long period of time, engagement between the ratchet teeth 142 and the pawl 172 is displaced by one tooth. Thus, the plunger 140 moves in the projecting direction from the inner body, and follows the elongation of the timing chain.

The outer body 110 and inner body 120 can be selectively assembled depending on the type of tensioner mount that is required. Thus, conventional tensioner assembly lines for various kinds of the tensioners can be unified so that reduction in manufacturing cost can be achieved by sharing equipment and saving factory space. Additionally, since the relative positioning of the outer body 110 and the inner body 120 can be reliably confirmed by use of the check valve unit 180 as a mounting reference during assembly, rapid and accurate assembly can be attained, and the labor required for assembly of the tensioner can be significantly reduced.

I claim:

1. A hydraulic tensioner comprising:
an outer body adapted to be mounted on an engine block, said outer body having a circular, cylindrical hole formed therein for receiving an inner body, said hole having an opening at one end thereof, and a bottom;
an oil passage for conducting oil under pressure into the interior of the outer body from the exterior thereof;
an inner body received in said hole, said inner body having an outer peripheral surface fitting said hole of the outer body, said outer peripheral surface being circular and cylindrical, and having a central axis; and
a plunger-accommodating hole formed in said inner body, and a plunger slidable in said plunger-accommodating hole and projecting therefrom in a forward direction, for applying tension to an endless, flexible, power transmission medium;
wherein said inner body has a check valve fitted thereto for conducting oil under pressure into said plunger-accommodating hole and preventing reverse flow of oil out of said plunger-accommodating hole, part of said check valve projecting axially from said inner body in a rearward direction opposite to said forward direction;
wherein said bottom of the hole of the outer body has a recess formed therein; said oil passage communicating with said recess; and
wherein said recess and said projecting part of the check valve are displaced radially from said central axis of the inner body, and said projecting part of the check valve fits into said recess.

2. A hydraulic tensioner according to claim 1, in which said outer body is composed of a synthetic resin.

* * * * *